Jan. 4, 1927.

P. W. SMITH

BELT LOOP

Filed Jan. 22. 1926

1,613,416

INVENTOR
Purnell W. Smith
By W. W. Williamson Atty.

Patented Jan. 4, 1927.

1,613,416

UNITED STATES PATENT OFFICE.

PURNELL W. SMITH, OF PHILADELPHIA, PENNSYLVANIA.

BELT LOOP.

Application filed January 22, 1926. Serial No. 82,930.

My invention relates to new and useful improvements in a belt loop, for trousers and more particularly a metal belt loop, the primary object of which is to provide an exceedingly simple and effective device of this character which may be readily and quickly attached without independent fastening means such as rivets or stitching.

Another object of my invention is to provide for securing the loop in position against accidental displacement.

A further object of the invention is to construct a belt loop from a strip of metal so fashioned as to provide an outer leg, an inner leg, and a body, said inner leg and body constituting the loop proper and the ends of both legs being bent inward, each toward the other leg, and serrated for gripping the article to which the loop is attached.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which.

Figure 1:
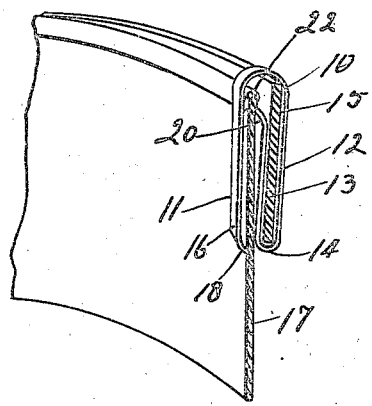
Fig. 1, is a fragmentary sectional perspective view of a pair of trousers with one of the belt loops in place and a belt passing therethru.
Figure 2:
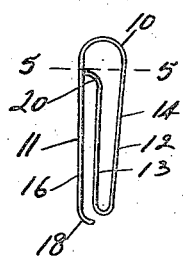
Fig. 2, is an edge view of the belt loop.
Figures 3, 4:
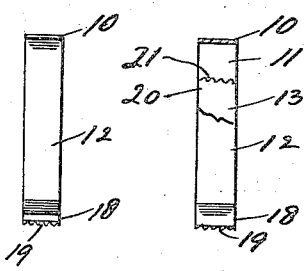
Fig. 3, is a front face view thereof.
Fig. 4, is a similar view with a portion of the upper end broken away.
Figure 5:
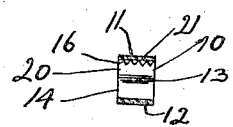
Fig. 5, is a section at the line 5—5 of Fig. 2.

In carrying out my invention as herein embodied, 10 represents the belt loop as a whole which is produced from a single strip of rather thin, narrow metal or other suitable material wound upon or about itself to provide an elongated or substantially oval coil consisting of or including an outer leg 11, a body or strap portion 12, and an inner leg 13, all of which are approximately parallel but separated sufficiently to form a space 14 for a belt 15 and another space 16 between the two legs for accommodation of waist portion of the trousers 17.

The free end of the outer leg is bent or turned inward toward the inner leg to produce a toe piece 18 which is serrated as at 19, while the free extremity of the inner leg is bent or turned outward toward the outer leg to provide a tongue 20 having serrations 21.

Trousers usually, if not invariably, have a turned over portion or hem 22, along the upper edge of the waist thus producing an enlargement, and in practice I make use of this enlargement by constructing the belt loop so that the upper end or tongue element of the inner leg engages beneath said enlargement to prevent the upward movement of the belt loop after being positioned.

The desired number of belt loops are placed on the trousers and a belt passed thru the space 14 of each, and when the belt is drawn taut the inner legs will be pressed against the outer surface of the trousers and the serrated ends caused to grip the goods, while the body of the wearer will hold the outer legs firmly against the inner surface of the goods causing the serrated ends of said outer legs to embed in the goods and prevent sidewise movement or displacement of the belt loops.

Of course I do not wish to be limited to the exact details of construction as herein shown as these may be varied within the limits of the appended claims without departing from the spirit of my invention.

Having thus fully described my invention, what I claim as new and useful is:

1. A belt loop including a body having a leg at each end, said legs projecting in opposite directions and overlapping each other, the end of each leg being turned toward the other leg and serrated.

2. A belt loop produced from a strip of metal wound about itself to form an elongated coil including a body, an inner leg and an outer leg both on the same side of the body, a serrated tongue at the end of the inner leg and projecting toward the outer leg for engagement with the hem of a trouser's waistband, and a serrated toe at the end of the outer leg and projecting toward the inner leg.

3. As an article of manufacture, a metal belt loop fashioned from a strip of thin, narrow material to produce a body, an inner leg projecting from one end of said body, and paralleling the same in spaced relation, said leg having its extremity turned outward, and an outer leg projecting from the other end of said body and overlapping the inner leg in parallel spaced relation, and said outer leg having its extremity turned inward.

4. A metal belt loop comprising a body, an inner leg paralleling the body and terminating in an outturned serrated portion for engagement with the outer surface on an object, and an outer leg paralleling the inner leg, and terminating in an inturned serrated portion for engagement with the inner surface of the object.

In testimony whereof, I have hereunto affixed my signature.

PURNELL W. SMITH.